United States Patent [19]

Marouby

[11] 4,157,850
[45] Jun. 12, 1979

[54] ELECTRONIC ANTISKID CONTROL DEVICE

[75] Inventor: Guy Marouby, Neuilly-sur-Seine, France

[73] Assignee: Societe Anonyme D.B.A., Paris, France

[21] Appl. No.: 833,533

[22] Filed: Sep. 15, 1977

[30] Foreign Application Priority Data

Oct. 4, 1976 [FR] France .................................. 76 29752

[51] Int. Cl.² ............................................... B60T 8/10
[52] U.S. Cl. .................................. 303/109; 188/181 C; 307/233 B; 361/238; 364/426
[58] Field of Search ........... 73/507; 180/82 R, 105 E; 188/181, 181 C; 303/20, 91, 95–97, 106, 109; 307/232, 233, 220 R, 295, 233 B; 318/608; 324/83 R, 83 A, 160–162, 166; 328/133, 134; 340/53, 62, 262, 263; 361/238, 242; 364/565, 566, 426

[56] References Cited

U.S. PATENT DOCUMENTS

| | | |
|---|---|---|
| 3,586,385 | 6/1971 | Florus et al. .......................... 303/96 |
| 3,650,575 | 3/1972 | Okamoto .......................... 303/109 X |
| 3,701,568 | 10/1972 | Lewis et al. .......................... 303/20 X |
| 3,780,346 | 12/1973 | Gagnon .............................. 303/95 X |
| 3,838,889 | 10/1974 | Miller ................................... 303/109 |
| 3,953,773 | 4/1976 | Fukumori ........................ 303/109 X |
| 3,985,396 | 10/1976 | Kuwana et al. ....................... 303/106 |
| 4,021,681 | 5/1977 | Miesterfeld ..................... 307/233 A |
| 4,050,747 | 9/1977 | Ruhnau et al. ......................... 303/95 |

FOREIGN PATENT DOCUMENTS

2618454   11/1976   Fed. Rep. of Germany ........... 303/109

*Primary Examiner*—Stephen G. Kunin
*Attorney, Agent, or Firm*—Paul David Schoenle; Ken C. Decker

[57] ABSTRACT

An electronic antiskid control device which comprises a frequency multiplier of the phase locked-loop type, which receives repetitive pulses of predetermined frequency representing the speed of one wheel. The phase locked-loop multiplier normally outputs a second pulse signal, the frequency of which is normally equal to the frequency of the wheel speed signal multiplied by a given number. A digital counter which is periodically reset at a frequency equal to that of the wheel speed signal measures the number of pulses of the second pulse signal during each period. The measured number is transfered into a memory element and calculating apparatus responsive to the value stored in the memory element control an antiskid cycle. In operation under normal conditions, the number stored in the memory element is constant and has no action on the calculating apparatus. In case of high deceleration or acceleration, the stored number momentarily deviates from its constant value so as to indicate a predetermined skid and control actuation of the antiskid device.

12 Claims, 5 Drawing Figures

FIG_4

ELECTRONIC ANTISKID CONTROL DEVICE

The invention relates to an electronic antiskid control device for a motor vehicle brake system.

This type of device is generally used for monitoring the variation in the rotational speed or acceleration of at least one wheel of a vehicle so as to supply an antiskid operating signal corresponding to the detection of a risk of the wheel skidding, the signal being intended to produce a reduction in pressure in the or each brake actuator associated with the or each wheel when the risk of skidding is present.

Numerous antiskid brake systems are known in which a wheel speed signal of which the voltage level represents the peripheral speed of at least one wheel of the vehicle is compared to a first reference signal which is normally less than the speed signal by a predetermined value, said reference signal having a law of decrease which is limited to a maximum rate. When the wheel speed signal decreases at a higher rate than the said maximum rate, therefore the reference signal becomes greater than the wheel speed signal and so as to produce an antiskid operating signal designed to effect the opening of a solenoid relief valve so that the braking pressure will be relieved.

Other known antiskid brake systems comprise means for comparing a wheel speed signal with a reference signal whose value is normally greater by a predetermined value than the wheel speed signal, but whose rate of increase is limited to a given value. In the course of a period of abrupt acceleration during an antiskid cycle, the wheel speed signal increases faster than the reference signal and eventually exceeds it, cancelling the antiskid operating signal and disconnecting the brake actuators of the vehicle from a low fluid pressure source.

In both these cases, the supply of the antiskid signal is effected according to the result of comparison of a signal whose level represents the wheel speed with a reference signal. Such operations are performed by means of complex analog electronic means which are susceptible to temperature and noise, and which consequently require numerous "compensating" adjustments. Also, frequency-to-voltage converters are essential in the antiskid circuits just mentioned, for converting the pulses delivered by a magnetic speed sensor.

To overcome these disadvantages, antiskid control devices have been proposed in which the pulse signals from one or more speed sensors are processed directly in a numerical manner. These devices, however, must be able to function over a relatively large speed range (3 to 200 km/h) and demand large capacity digital circuits (counters, stores), which considerably complicates their design and increases their cost, since the digital circuits must be able to process signals whose frequency may vary between 1500 and 100,000 Hertz.

An object of the invention is to propose an electronic antiskid control device, for a motor vehicle brake system, which is essentially digital in type, is simple in design and tends to reduce the disadvantages of the numerical circuits mentioned above.

According to the invention, a signal whose frequency represents the speed of a wheel is fed to a frequency multiplier with a given multiplication ratio. A number which is a function of the ratio between the frequencies of the output and input signals of the multiplier is calculated at intervals of time. In the event of a change of frequency of the input signal (acceleration or deceleration), the frequency of the output signal varies so as to keep the ratio between the frequencies of the output and input signals equal to the multiplication ratio. However, during transient operation following the change of frequency, the calculated number representing the frequency ratio may temporarily assume values different from the value of the multiplication ratio. Since the measured ratio between the frequencies of the output and input signals is related to the wheel slip, an antiskid cycle is initiated when the calculated number represents a wheel slip during deceleration which exceeds a first predetermined value. Similarly, an antiskid cycle is terminated when the calculated number represents a wheel slip during acceleration which exceeds a second predetermined value.

According to one feature of the invention, the calculated number is supplied in the form of a digital signal which is subsequently processed by decoding means to generate, maintain or cancel the antiskid signal according to the value of the said number, that is, according to the wheel slip, as explained before.

According to another advantageous feature of the invention, the digital signal representing the wheel slip has a given and constant number of bits irrespective of the wheel speed level. The digital signal can therefore be supplied by numerical calculating means, of given capacity independant of the speed range which the vehicle may cover. Also, the capacity of the calculating means can be fixed at a relatively low value, which has special advantages as regards compactness and low cost.

In a particular embodiment of the invention, the calculating means comprise a counting circuit of which the input receives the output signal from the frequency multiplier and of which the counting period equals the period of the speed signal, and a storage element connected to the output of the counting circuit, the store being capable of storing the measured value contained in the counting circuit in response to the supply of a read-in signal whose frequency equals the frequency of the speed signal, the store supplying the digital signal representing the wheel slip, that is, the number calculated by the counting circuit during the counting period just concluded.

The invention will now be described, and further advantages will be apparent, from the ensuing description referring to the drawings, in which.

Figure 1:
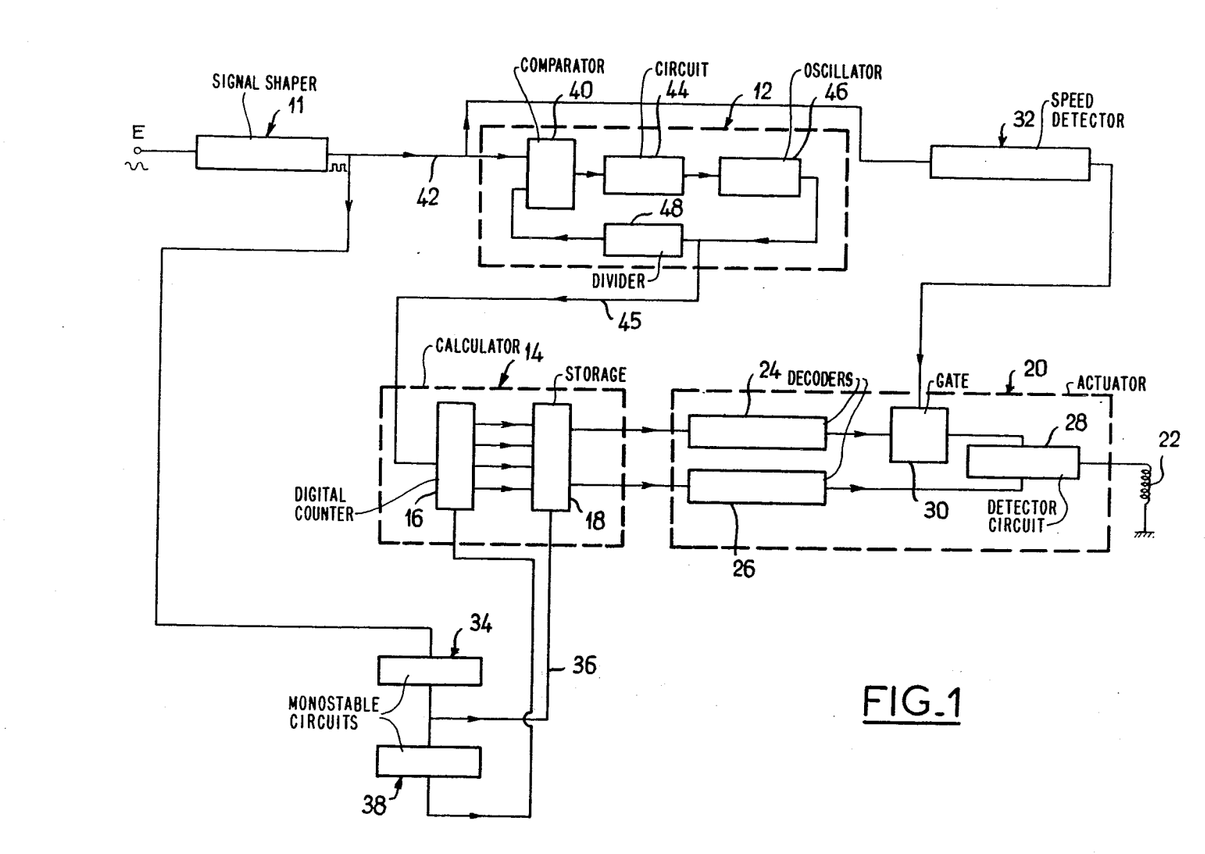
FIG. 1 represents a block diagram of an embodiment of the electronic antiskid braking control device in accordance with the invention.

The circuit illustrated in FIG. 1 comprises a signal shaping circuit 11 of which the input terminal E can receive a signal of variable frequency from a speed sensor (not shown). The speed sensor is associated with one wheel of the vehicle or with any other rotary member rotationally connected to at least one wheel of the vehicle (for example, the power input or output shaft of the differential), so that it supplies a signal whose frequency is proportional to the rotational speed of the wheel or rotary member. The signal is shaped by the circuit 11, which outputs a square-wave speed signal having the same frequency as the input signal. The output terminal of the circuit 11 is connected to the input of a frequency multiplier circuit 12, described in more detail below. Here it need merely be stated that the frequency multiplier circuit supplies, under steady-state conditions, an output signal whose frequency equals the frequency of the speed signal multiplied by the multiplication factor of the multiplier.

The output signal of the multiplier 12 is then fed to the input of calculating means 14, comprising in series a digital counting circuit 16 capable of outputting a number in digital form, and a storage element 18 to which the number contained in the counting circuit can be transferred in response to a store signal. The store signal is supplied by appropriate means described below. The signal entered in the storage element 18 is then fed to operating means 20 capable of outputting a signal to actuate a solenoid relief valve 22 of any known type, or a brake modulator at particular values of the number entered in the storage element 18.

The operating circuit 20 essentially comprises a first decoding circuit 24 and a second decoding circuit 26. The functions of the circuits 24, 26 will be explained in the description referring to FIG. 2. The output signal from the decoding circuit 24 is fed to the operating terminal of a monostable circuit 28 which can supply the signal to energize the solenoid valve 22. The output signal from the decoding circuit 26 is fed to the stop terminal of the circuit 28. Gate forming means 30 are provided between the output terminal of the decoding circuit 24 and the monostable actuating circuit 28. These gate forming means are controlled by the output signal from a minimum speed detector 32 connected to the output terminal of the circuit 11. The gate forming means 30 are rendered conductive when the rotational speed of the wheel or rotary member exceeds a predetermined minimum value.

The electronic control device also comprises a first monostable circuit 34 responsive to one edge of the signal from the wave forming circuit 11 so as to supply a store signal. This edge is substantially termed the "operating edge". The store signal is transmitted to the storage element 18 by a connection 36 in order to enter the signal contained in the counting circuit 16. The counting circuit 16 is periodically reset to zero by the output signal from a second monostable circuit 38 operated by the trailing edge of the signal from the monostable circuit 34. Consequently the counting circuit 16 is reset to zero almost immediately after its contents have been transferred to the storage element 18. The counting circuit 16 recommences counting the number of periods of the output signal from the multiplier circuit 12 until the next operating edge of the output signal from the circuit 11 appears. At this instant the contents of the counting circuit 16 are transferred to the store, which now contains a number indicating the number of periods of the output signal of the multiplier 12 during one period of the speed signal. In other words, the number entered in the storage element 18 equals the ratio between the frequencies of the output signal from the multiplier 12 and the speed signal during one period of the speed signal.

The frequency multiplier circuit shown in FIG. 1 will now be described in more detail. It comprises a phase comparator 40 of which a first input receives the speed signal from a connection 42. The second input of the phase comparator 40 receives a signal of which the nature will be stated below. The phase comparator supplies a signal of negative, zero or positive level according to the result of the phase comparaison. This output signal from the comparator 40 is then fed to a circuit 44, which supplies an increasing, constant or decreasing signal according to the level of the output signal from the comparator 40. The circuit 44 is preferably formed by a linearly varying integrator with an adjustable time constant. The output of the circuit 44 is connected to the input of a voltage-driven oscillator 46. The comparator 40, circuit 44 and oscillator 46 together comprise the constituents of a circuit which will be termed a circuit of the "phase loop" type. A frequency divider circuit 48 with a given division ratio is connected in a known manner between the output of the oscillator 46 and the second input of the phase comparator 40, and the resulting circuit constitues the frequency multiplier 12. The output signal from the voltage-driven oscillator 46 is fed along a connection 45 to the calculating means 14 as explained above. Although the frequency division ratio of the circuit 48 may be as desired, it will be assumed that this ratio is 10 in the embodiment described. Under steady-state conditions, that is, when the frequency of the signal supplied to the connection 42 is constant, therefore, the frequency of the signal from the circuit 12 will of course be ten times the frequency of the speed signal. As a result, the value of the signal entered in the storage element 18 is always equal to 10. If the frequency of the speed signal varies, the multiplier circuit 12 operates so as to keep the ratio between the frequencies of the output and input signals equal to the multiplication factor (10 in this embodiment). It can therefore be stated that the frequency of the output signal depends on the frequency of the input signal. However, the multiplier 12 reacts slowly to a variation in frequency of the input signal, and the ratio between the frequencies of the output signal of the multiplier and the speed signal differ from 10 during a transient period, before tending to resume this value again when the speed has stabilized again. The counter 18 will therefore produce a succession of digital data deviating from the value 10 and then tending to return progressively to this value with time.

Figure 2:
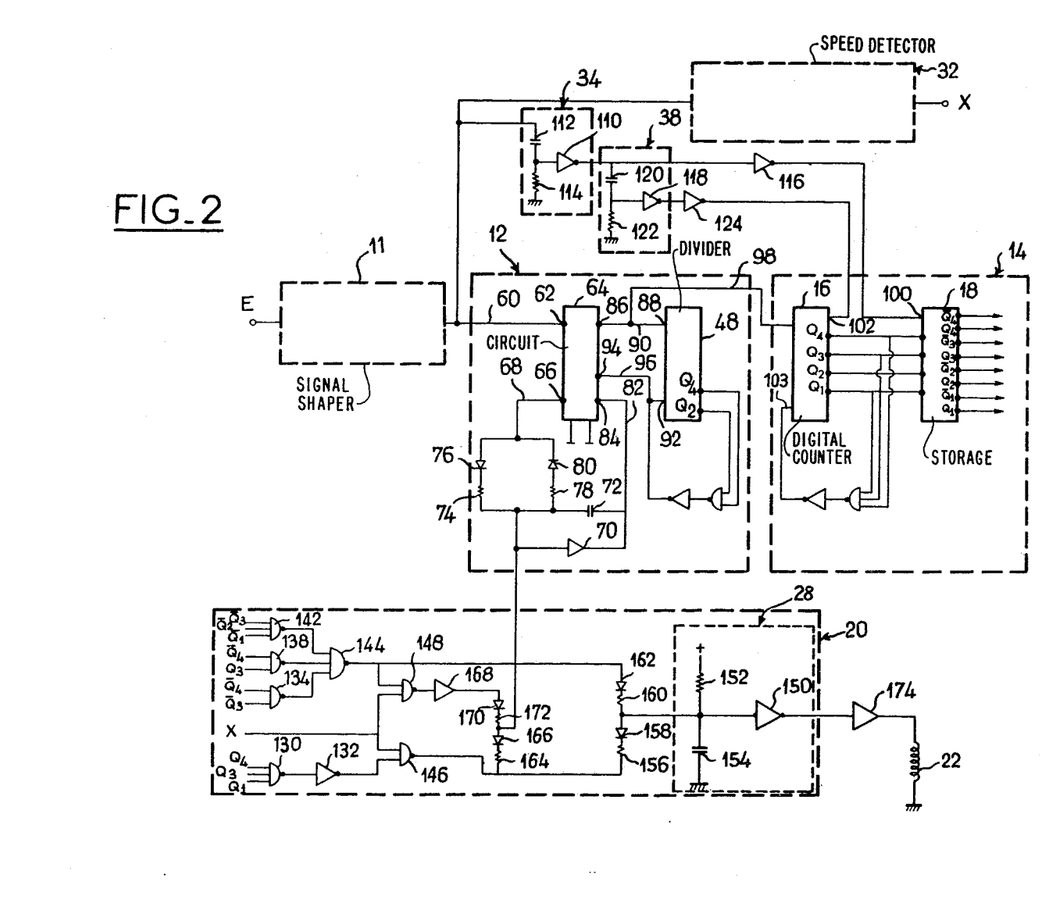
FIG. 2 is a detailed circuit diagram of the electronic device illustrated in FIG. 1.

FIG. 2 illustrates a more detailed electronic diagram of the control device shown in FIG. 1.

The signal shaping circuit 11 is not shown in detail, since such a circuit is well known in the antiskid art and, moreover, is not a real part of the invention. It need merely be stated that the circuit 11 receives an alternating signal from a sensor and outputs a square-wave signal whose amplitude is of the order of 10 V, this voltage being substantially equal to the supply voltage for the electronic circuits which constitute the antiskid operating device embodying the invention.

The multiplier circuit 12 comprises an input connection 60 connected to the input terminal 62 of a circuit 64 which contains the phase comparator 40 and the voltage-driven oscillator 46. The output 66 of the phase comparator is connected to the input of the above-mentioned integrator by a connection 68. The integrator comprises, in conventional fashion, an operational amplifier 70 of which the output is strapped to its negative input by way of a capacitor 72. The input of the amplifier 70 is connected to the connection 68, firstly by way of a resistor 74 in series with a diode 76 conducting from the connection 68 towards the amplifier 70, and secondly by way of a second resistor 78 in series with a diode 80 conducting from the input of the amplifier 70 towards the connection 68. The output of the amplifier 70 is connected to the input 84 of the voltage-driven oscillator by a connection 82. The output 86 of the oscillator is linked to the input 88 of the frequency divider 48 by a connection 90 and to the input of the calculating means by way of an output connection 98 joined to the connection 90. The frequency divider 48 supplies at its output 92 a signal whose frequency is normally one-tenth of the frequency of the signal at the input 88. This frequency-divided signal is fed to the second comparison input 94 of the phase comparator along a connection 96.

The calculating means 14 essentially comprise a conventional digital counter 16, whose input is joined to the connection 98 and which will count the number of periods of the output signal from the multiplier counter 12 during a predetermined period of time, as explained below. The number of digits in the counter 16 may be determined as desired, depending on the operating requirements of the device. In this description, however, it will be assumed that the counter 16 outputs a 4-bit digital signal. The outputs Q1 to Q4 of the counter 16 are connected to the respective inputs of the storage element 18, whose capacity is identical to that of the counter 16 (4 bits). The storage element 18 has an input 100 designed to receive a signal to enter the signal contained in the counter 16. Also, the counter 16 has a zero resetting input 102, so that the counter can be reset to its initial state in response to an operating signal.

The monostable circuit 34 comprises a logic inverter 110 whose input receives the output signal from the circuit 11 by way of a capacitor 112. In addition the input of the inverter 110 is earthed by way of a resistor 114. When a positive edge appears at the output of the circuit 11, the output of the inverter 110 supplies a low-level signal whose duration is determined by the value of the capacitor 112 and resistor 114. This signal is fed to an inverter 116 so as to transmit an operating signal to the read-in input 100. The monostable circuit 38 is identical to the monostable circuit 34 and comprises a logic inverter 118, capacitor 120 and resistor 122. The monostable circuit 38 responds to the positive edge corresponding to the end of the negative pulse from the monostable circuit 34, so as to supply a negative pulse which is transmitted by way of a logic inverter 124, to the zero resetting input 102 of the counter 16, returning the latter to its initial state. The values of the capacitor 112 and resistor 114 are selected so that the durations of the store pulse supplied to the input 100 and of the zero resetting pulse for the counter, supplied to the terminal 102, are negligible compared with the periods of the output signals from the signal shaping circuit 11 and multiplier circuit 12. The details of the operating circuit 20 will be described below.

Operation of the circuit 12 and calculating means 14 will now be explained.

Let us assume initially that the peripheral speed of the wheel or the rotary member rotationally connected to the wheel of the vehicle is constant.

The control circuit is in a steady state, so that the signal at the second input 94 of the phase comparator is at the same frequency as the input signal. The circuit 12 then supplies an output signal whose frequency is 10 times that of the signal at the input 62. The phase comparator supplies a signal of 0 level at its output terminal 66. As a result, the charge of the integrator is not modified, and the latter supplies the input 84 of the voltage-driven oscillator with a signal of constant amplitude whose level determines the frequency of the signal at the output 86, so that this frequency is 10 times the frequency of the input signal.

When the wheel speed decreases, the frequency of the input signal of the circuit 12 also decreases. The phase comparator then supplies the output 66 with a signal of negative level −H, which then controls linear charging of the capacitor 72 of the integrator by way of the resistor 78 and diode 80. Since the voltage-driven oscillator is designed so that the frequency of the output signal decreases as a function of the voltage level at its input, it will be appreciated that the charging of the capacitor 72 leads to a reduction in frequency of the signal at the oscillator output 86. The system then operates under transient state conditions until the frequency of the signal at the input 94 is again equal to the frequency of the signal at the input 62. At this instant the frequency of the output signal from the circuit 12 is again ten times the frequency of the input signal.

When the wheel speed increases, the frequency of the signal at the input 62 increases, and the phase comparator then supplies a signal of positive level +H which is transmitted to the negative input of the amplifier 70 by way of the diode 76 and resistor 74. The capacitor 72 of the integrator is then discharged linearly with a discharging time constant determined by the values of the resistor 74 and capacitor 72. Consequently, the frequency of the signal at the output 86 of the voltage-driven oscillator increases, reaching a new value equal to ten times the new frequency of the speed signal. At this instant the frequency of the signal at the terminal 94 is identical to that of the input signal at the input 62, and the comparator delivers at the output 66 a signal of 0 level so as to stop discharging of the integrator and maintain the new value of the frequency of the output signal.

Because of the time constants of the integrator, the frequency of the signal at the input 94 does not decrease or increase as fast as the frequency of the signal at the input 62. One may therefore consider that the frequency of the signal at the input 94 represents the level of a speed reference signal of which the positive or negative rates of variation are limited to predetermined values.

If the frequency of the wheel speed signal is considered to represent the peripheral speed of the wheel and the frequency of the signal at the input 94 is considered to represent a reference signal which approximately represents the speed of the vehicle, the value of the digital number supplied by the storage element 18 is related to the value of the wheel slip during the last period of the wheel speed signal. This digital number represents the ratio between the frequencies of the output signal from the circuit 12 and of the speed signal, that is, in other words, the ratio between the frequencies of the signals at the inputs 62, 94 of the phase comparator.

The following table illustrates the correspondence between the ratio A of the frequencies of the wheel speed signal and reference signal, the ratio B of the frequencies of the output and input signals of the circuit 12, and also the absolute value of the corresponding slip G (expressed as a percentage).

| A | B | G |
|---|---|---|
| 1.5 | 6.7 | 50 |
| 1.4 | 7.2 | 40 |
| 1.3 | 7.7 | 30 |
| 1.2 | 8.35 | 20 |

-continued

| A | B | G |
|---|---|---|
| 1.1 | 9.1 | 10 |
| 1 | 10 | 0 |
| 0.9 | 11.1 | 10 |
| 0.8 | 12.5 | 20 |
| 0.7 | 14.25 | 30 |
| 0.6 | 16.6 | 40 |
| 0.5 | 20 | 50 |

Figure 4:
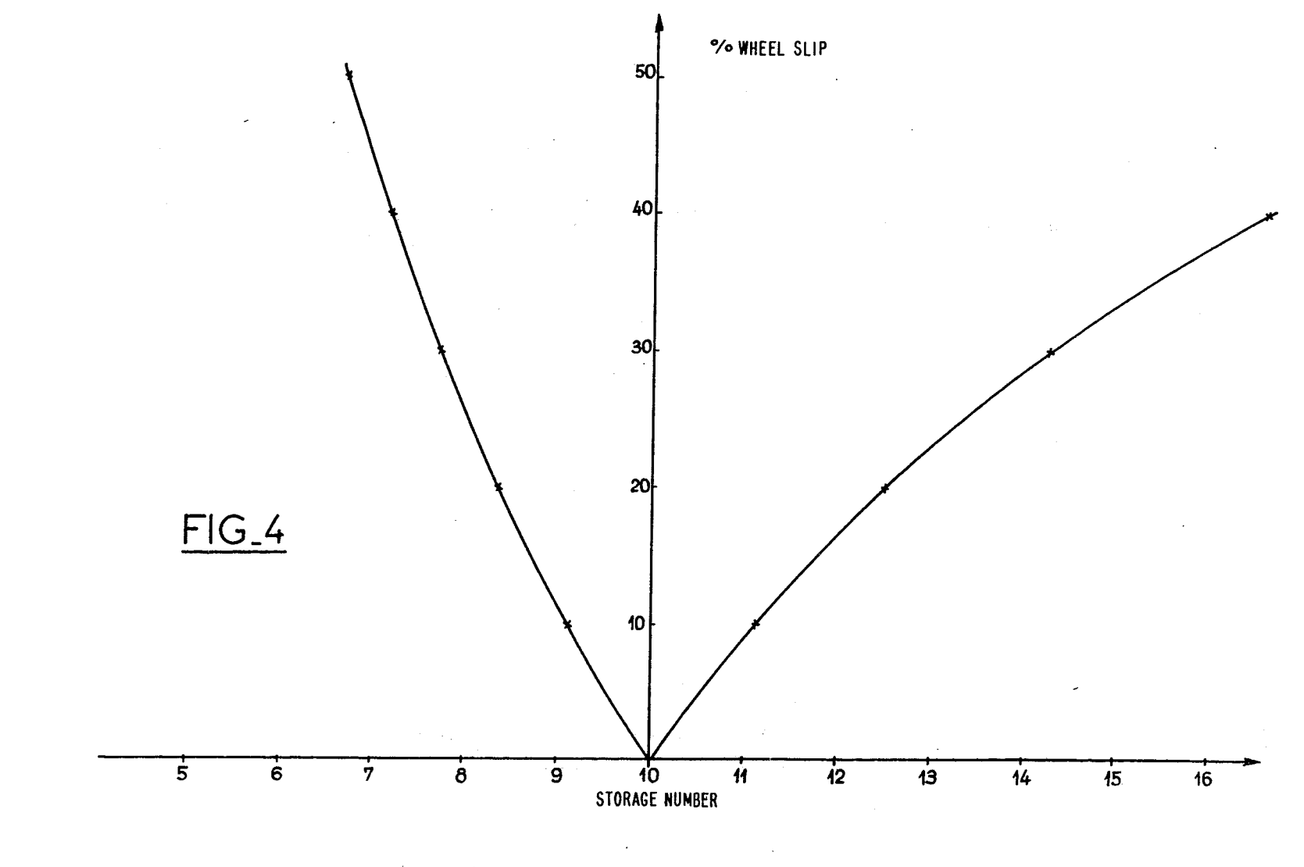
FIG. 4 is a curve representing the wheel slip as a function of the number entered in the storage element.

From this table it is possible to extrapolate the slip values corresponding to each value entered in the storage element 18 (see FIG. 4). An approximate wheel slip value can therefore be determined from any value entered in the storage element 18. This information is supplied by compact digital circuits (4 bits in this embodiment) which are relatively simple in design. Also, these circuits can operate over a wide wheel speed range (the frequency of the wheel speed signal being between 1500 and 100,000 Hertz).

Figure 3A:
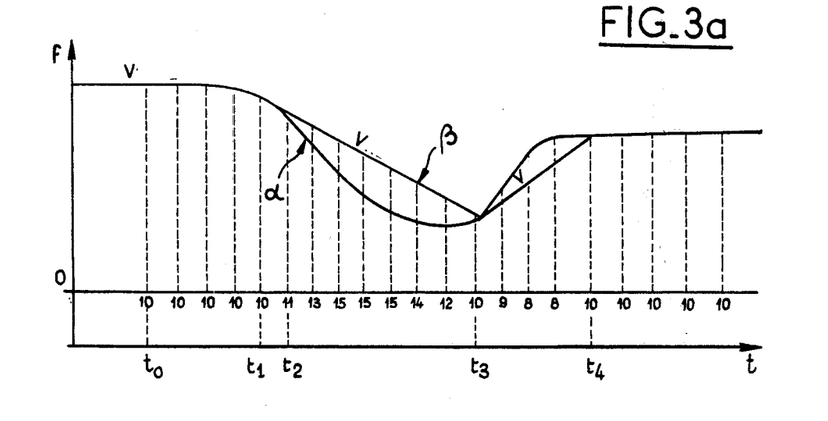
FIGS. 3a, 3b represent curves illustrating the operation of the circuit shown in FIGS. 1 and 2.

In FIG. 3a, a curve $\alpha$ represents the frequency of the wheel speed signal, and a curve $\beta$ represents the frequency of the reference signal at the input 94 of the phase comparator.

During a first phase, in which the wheel speed is substantially constant, the curves $\alpha$ and $\beta$ coincide, and the number set at the output of the storage element 18 is equal to 10.

Since from an instant t1 the wheel speed diminishes faster than the reference speed, the curve deviates in the negative direction from the curve representing the reference speed defined by the integrator. At an instant t2, at which the number counted by the counter 16, after the wheel speed has begun to drop, is first stored, the storage element enters the value 11 representing a certain wheel slip (see FIG. 4). Subsequently another value is read into the storage element at the end of each period of the speed signal, and this value becomes equal to 10 again at an instant t3 at which the frequency of the reference signal is again substantially the same as the frequency of the wheel speed signal. In the embodiment shown in FIG. 3a, the number entered in the storage element 18 between the instants t2 and t3 assumes the following successive values: 11, 13, 15, 15, 15, 14, 12, 10, that is to say, the slip increases and then diminishes due to the relief of the pressure in the brakes. After the instant t3 the wheel speed increases faster than the frequency of the reference speed signal. In this case the values entered in the storage element 18 assume successive values below 10, until at an instant t4 the frequency of the reference speed signal again equals the frequency of the wheel speed signal. In the embodiment illustrated, the storage element contains the following successive values between the instants t3 and t4: 10, 9, 8, 8. From the instant t4, the wheel speed becomes constant again, and the device is again in its steady state. Consequently, the signal entered in the storage element 18 from the instant t4 again assumes the value 10, at which it them remains.

The preceding description, relating to FIGS. 2 and 3a, mainly illustrates the principles of calculation of wheel slip during decrease or increase of wheel speed, but does not allow for the fact that the counter 16 is blocked due to strapping to its inhibiting input 103, so that the number which it can calculate cannot exceed a value n' which is greater than the value n of the multiplication factor of the multiplier, but which is less than its maximum counting capacity. The advantage of such a feature will be explained below.

The general principle of the antiskid operation produced by the operating means 20 will now be explained. The electronic antiskid control device is designed so that the antiskid operating signal is delivered when the wheel slip during deceleration or acceleration exceeds a given threshold, that is, when the number calculated by the counting circuit 16 and transferred to the storage element 18 is greater than or equal to a predetermined value (this value is set at 13 in this embodiment), which in turn is greater than the value of the division ratio of the circuit 48. It is therefore necessary to supply the antiskid signal at any value greater than or equal to 13 calculated by the counting circuit 16 and entered in the storage element 18. As already mentioned, the counting circuit 16 is blocked, so that the value contained in it cannot exceed the value 13. Such a feature has two advantages: it prevents the capacity of the counting circuit 16 from being exceeded in the event of rapid deceleration of the vehicle wheel; and the decoding circuit 24 mentioned above is considerably simpler, since only the value 13 need be decoded in order to effect the delivery of the antiskid signal.

The electronic antiskid operating device is also designed so that the antiskid operating signal is suppressed when the wheel slip during acceleration exceeds a predetermined threshold. To this end, the decoding means 26 are provided to detect any number which is entered in the storage element 18 and whose value is less than or equal to another predetermined value (8 in this embodiment), which in turn is less than the value of the multiplication factor of the frequency multiplier 12. The decoding circuit 26 then supplies a signal to operate the output circuit 28 so as to cancel the antiskid operating signal. The signal from the circuit 24 is transmitted to the circuit 28 by way of the gate 30 mentioned above.

The design of the operating means 20 illustrated in FIG. 2 will now be described in detail.

The decoding circuit 24 comprises a NAND gate 130 in series with a logic inverter 132. The NAND gate 130 has three inputs which respectively receive the output signals Q1, Q3, Q4 from the storage element 18 so as to decode the value 13. When the number 13 is entered in the storage element 18, the NAND gate 130 then receives logic signals of level 1 and outputs a logic signal of level 0, which is inverted by the inverter 132 so as to supply a logic signal of level 1 at its output. For all values other than 13 entered in the storage 18, the inverter 132 supplies a logic signal of level 0.

The decoding circuit 26 comprises a first NAND gate 134 with two inputs which are connected respectively to the outputs $\overline{Q3}$ and $\overline{Q4}$ of the storage element 18, so that the gate 134 delivers a logic signal of level 0 when the number entered in the storage element 18 is between the values 0 and 3, whereas it delivers a logic signal of level 1 in other cases. The circuit 26 also comprises a second NAND gate 138 with two inputs connected respectively to the outputs $\overline{Q3}$ and $\overline{Q4}$ of the storage element 18, so that the gate 138 supplies a signal of level 0 when the number entered in the storage element 18 is between 3 and 7 and supplies a signal of level 1 in other cases. The circuit 26 also comprises a third NAND gate 142 with three inputs, connected respectively to the outputs $\overline{Q1}$, $\overline{Q2}$ and $\overline{Q3}$ of the storage element 18, so that the NAND gate 142 supplies a signal of level 0 when the number entered in the storage element 18 has the value 8 and supplies a signal of level 1 in all other cases.

The decoding circuit 26 also comprises a NAND gate 144, with three inputs connected respectively to the outputs of the NAND gates 134, 138 and 142. The NAND gate 144 therefore supplies a signal of level 0 when the signals from the NAND gates 134, 138 and 142 are at a logic level equal to 1. If, however, one of the signals at the inputs of the NAND gate 144 is at a logic level 0, this gate will supply a logic signal of level 1. To summarize, the NAND gate 144 supplies a signal of logic level 0 when the value entered in the storage element 18 does not equal any of the values between 0 and 8, and supplies a signal of level 1 when one of the NAND gates 134, 138 and 142 supplies a logic signal of level 0, that is, when the number entered in the storage element 18 is between 0 and 8.

The gate 30 comprises a NAND gate 146 with two inputs, one connected to the output of the logic inverter 132 and the other to the output of the minimum speed detector circuit 32. The circuit 32 is not shown in detail and may be formed of any suitable means. It may merely be stated that the detector 32 supplies a signal of logic level 1 at its output X when the speed signal from the circuit 11 has a frequency above a given minimum frequency.

The operating circuit 20 also comprises a NAND gate 148 with two inputs, of which one is connected to the output of the NAND gate 144 and the other to the output X of the detector of minimum wheel speed 32. The output of the NAND gate 146 is connected to the input of the monostable operating circuit 28. The latter comprises a logic inverter 150 of which the input is connected both to the positive supply voltage source by way of a resistor 152 and to earth by way of a capacitor 154. The output of the NAND gate 146 is connected to the input of the inverter 150 by way of a resistor 156 and by way of a diode 158 which conducts from the inverter 150 towards the NAND gate 146. The output of the NAND gate 144 is also connected to the input of the inverter 150 by way of a resistor 160 and a diode 162 conducting from the NAND gate 144 towards the logic inverter 150. The output of the NAND gate 146 is also connected to the input of the operational amplifier 70 of the integrator 44 by way of a resistance 164 and a diode 166, conducting from the amplifier 70 towards the gate 146. The NAND gate 148 is also connected to the input of the amplifier 70 by way of a logic inverter 168, a diode 170 conducting from the logic inverter 168 towards the amplifier 70, and a resistor 172. The output of the circuit 18, i.e. the output terminal of the logic inverter 150, is connected to the solenoid valve 22 by way of a power amplifier 174.

Figure 3B:
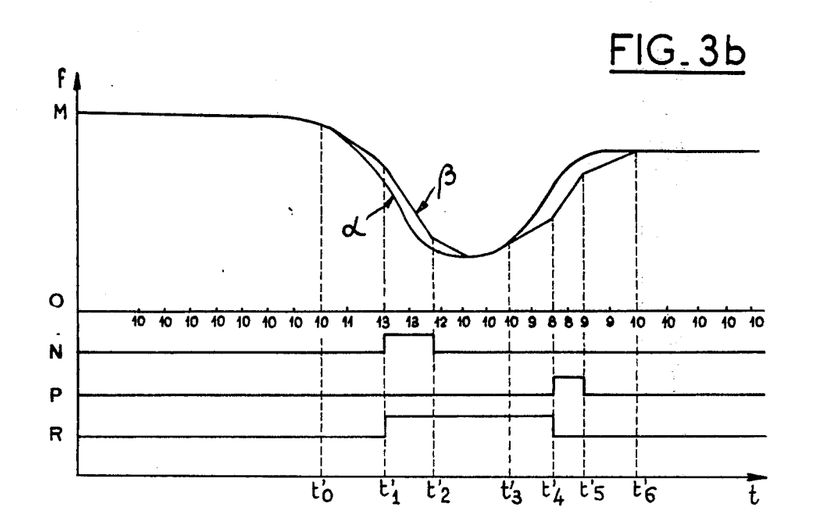

The operation of the control means 20 will now be described in detail with reference more particularly to FIG. 3b of the drawings. In this Figure a curve M represents the variation in the frequencies of the wheel speed signal and reference speed signal mentioned above, a curve N represents the output signal from the inverter 132, a curve P represents the output signal from the NAND gate 144, and a curve R represents the output of the inverter 150.

Let us assume initially that the wheel speed is constant, as in the case of FIG. 3a. The number calculated by the counting circuit 16 is transferred to the storage element 18 at the end of each period of the wheel speed signal, and its value is always equal to 10. At an instant t'0, the wheel speed decreases following application of the brakes of the vehicle. The frequency of the speed signal falls below that of the reference signal. The number calculated by the counting circuit 16 and transferred to the storage element 18 then assumes values greater than 10 during the successive periods of the wheel speed signal. During a first phase, between instants t'0 and t'1, the decrease in the frequency of the reference signal is determined by the charging time constant of the integrator, which depends on the values of the capacitor 72 and resistor 78. From the instant t'1 at which the number 13 is transferred to the storage element 18, the logic inverter 132 supplies a signal whose logic level is equal to 1. Assuming also that the wheel speed exceeds the minimum speed determined by the threshold of the circuit 32, the NAND gate 146 now outputs a signal of level 0 from the instant t'1. The diode 166 is now conductive, and the resistor 164 is connected in parallel with the resistor 78 so as to reduce the charging time constant of the integrator, which results in an increase in the slope of the reference signal $\beta$. The connection between the output of the NAND gate 146 and the input of the amplifier 70 enables the rate of decrease of the signal $\beta$ to be increased when the signal transferred to the storage element 18 is equal to 13, that is, when the wheel slip exceeds a predetermined value. This is what occurs between the instants t'1 and t'2 in FIG. 3b. After the instant t'2 at which the number entered in the storage element 18 falls below 13 again, the maximum rate of decrease resumes the value fixed by the values of the capacitor 72 and resistor 78.

On the other hand, the delivery of a signal of level 0 at the output of the NAND gate 146 also affects the state of the actuating circuit 28. The latter normally supplies a logic signal of level 0 when the capacitor 154 is charged to the value of the supply voltage. In response to the delivery of the signal of logic level 0 at the output from the NAND gate 146, the diode 158 is rendered conductive, discharging the capacitor 154 almost instantaneously. The logic inverter 150 delivers at its output an antiskid operating or control signal which is to operate the solenoid valve 22. As long as a signal of level 0 is delivered at the output of the NAND gate 146, the capacitor 154 is kept discharged, and the antiskid operating signal is delivered. When this output signal from the NAND gate 146 is cancelled, that is, when the number 13 is no longer entered in the storage element 18, the capacitor 154 is progressively recharged by way of the resistor 152. Consequently the actuating circuit 28 can continue to supply an antiskid operating signal during a period of time determined by the charging time constant of the capacitor 154, until the moment at which the voltage level at the input of the logic inverter 150 is sufficient to restore the latter to its initial state. However, as will be clear below, the inverter 150 can be returned to its initial position more rapidly in response to special operating conditions of the electronic antiskid operating device.

From an instant t'3, the frequency of the wheel speed signal increases so as to exceed the frequency of the reference speed signal. The number calculated by the counting circuit 16 and transferred to the storage element 18 assumes values lower than 10. When this number reaches the value 8 or a value below 8, this indicates that the wheel slip during acceleration is greater than a predetermined limit, from which it is necessary to conclude antiskid operation. This occurs at an instant t'4, from which the number contained in the storage element 18 assumes the value 8 in this embodiment. From this instant, therefore, the NAND gate 144 delivers a signal of logic level 1, making the diode 162 conductive and immediately charging the capacitor 154 to a value high enough to bring the output level of the logic inverter 150 to 0 and so to cancel the antiskid operation signal (curve R). Obviously, if the output signal from the NAND gate 144 appears before the capacitor 154 has been recharged to a high enough level by way of the resistor 152, the monostable circuit 28 will be restored to its initial state more rapidly. Note also that the appearance of the level 1 at the output of the NAND gate 144 produces a change in the discharging time constant of the integrator 44. The resistor 172 is then conducted in parallel with the resistor 74, reducing the discharging time constant of the integrator. The rate of increase of the frequency of the reference signal is then increased when the wheel slip during acceleration exceeds the predetermined value corresponding to the number 8 entered in the storage element 18. This occurs between the instants $t'4$ and $t'5$ in FIG. 3b. After the instant $t'5$ the reference signal resumes its normal maximum rate of increase, determined by the value of the capacitor 72 and resistor 74, until an instant $t'6$ at which the wheel speed is again constant and the curves and again coincide, so that the storage element enters a succession of numbers whose value are each equal to 10.

I claim:

1. An electronic antiskid control device for a motor vehicle brake system, comprising in combination, a frequency multiplier circuit responsive to a speed signal, the frequency of which represents the peripheral speed of one wheel of a vehicle and supplying an output signal whose frequency is such that the ratio between the frequency of the output signal and the frequency of the speed signal normally assumes a predetermined value equal to the multiplication factor of the multiplier when the peripheral speed of the said one wheel is substantially constant, the ratio between the frequencies of the output signal and speed signal being capable of deviating temporarily from its normal value in response to a variation in the frequency of the speed signal, the improvement wherein a calculating means 14 supplies at intervals of time a number which is a function of the ratio between the frequencies of the output signal and speed signal and which represents the wheel slip, an actuating means 20 is responsive to the value of the number supplied by the calculating means 14 so as to generate an antiskid signal to control an antiskid cycle, the calculating means 14 comprises a counting circuit 16 of which the input receives the output signal from the frequency multiplier circuit 12 and of which the counting period equals the period of the speed signal, and a storage element 18 connected to the output of the counting circuit 16, the storage element 18 being capable of storing the value contained in the counting circuit in response to the supply of a store signal whose frequency equals the frequency of the speed signal, the storage element 18 supplying the number representing the wheel slip, and the store signal being supplied by a first monostable circuit 34 responsive to one edge of the speed signal.

2. An electronic device as claimed in claim 1, characterized in that a second monostable circuit 38 is responsive to the output signal from the first monostable circuit 34 so as to supply a signal for resetting the counting circuit 16.

3. An electronic device as claimed in claim 1, characterized in that the counting circuit 16 is arranged so that the value entered in said circuit cannot exceed a given value which is greater than the multiplication factor of the multiplier and less than the maximum counting capacity of said circuit.

4. An electronic device as claimed in claim 3, characterized in that the operating means 20 comprise a circuit 24 for decoding the given value so as to supply a first decoded signal when the number entered in the storage element 18 possesses the given value, the actuating means also comprising an output circuit 28 capable of supplying an antiskid signal in response to the appearance of the first decoded signal.

5. An electronic device as claimed in claim 1, characterized in that the operating means 20 comprises decoding means 26 for supplying a second decoded signal when the number entered in the storage element is less than or equl to a given threshold, the threshold value being less than the multiplication factor of the multiplier, the actuating means 28 also comprising an output circuit responsive to the supply of the other decoded signal so as to cancel the antiskid signal.

6. An electronic device as claimed in claim 1, characterized in that the frequency multiplier circuit 12 comprises a phase comparator 40 of which the first input receives the speed signal, a frequency control circuit 44 is responsive to the output signal from the phase comparator 40 so as to supply an increasing, constant or decreasing signal according to the result of the phase comparison, an oscillator 46 controlled by the signal supplied by the control circuit so as to supply a signal of which the frequency depends on the frequency of the speed signal, and a frequency divider circuit 48 of which the division ratio equals the normal value of the ratio between the frequencies of the output signal and speed signal, the frequency divider circuit 48 being responsive to the output signal of the oscillator so as to supply a frequency divided signal to the second input of the phase comparator, the signal at the oscillator 46 output constituting the output signal of the frequency multiplier circuit.

7. An electronic device as claimed in claim 6, characterized in that the phase comparator 40 is adapted to supply a signal of positive, zero or negative level according to whether the frequency of the speed signal exceeds, equals or is below the frequency of the frequency-divided signal, the frequency control 44 circuit being constituted by an integrating device of which the output signal controls the frequency of the oscillator so that the said frequency is dependent on the frequency of the speed signal.

8. An electronic device as claimed in claim 7, characterized in that the integrating device 44 comprises a capacitor 72, the capacitor being chargeable according to a first predetermined rate of charge when the output signal from the phase comparator occupies one of the positive and negative levels, or dischargeable at a second predetermined rate of charge when the output signal occupies the other of the positive or negative levels.

9. An electronic device as claimed in claim 8, characterized in that the first and second rates of charge are linear.

10. An electronic device as claimed in claim 7, characterized in that the integrating device has a given charging time constant and the operating means 20 includes a circuit 21 for supplying a first decoded signal, the time constant being susceptible to be modified when the first decoded signal is supplied.

11. An electronic device as claimed in claim 10, characterized in that said circuit 21 is capable of supplying a second decoded signal, and said time constant being susceptible to be modified when the second decoded signal is supplied.

12. An electronic antiskid control device for a motor vehicle brake system, comprising in combination, a frequency multiplier circuit responsive to a speed signal the frequency of which represents the peripheral speed of one wheel of a vehicle and supplying an output signal whose frequency is such that the ratio between the frequency of the output signal and the frequency of the speed signal normally assumes a predetermined value equal to the multiplication factor of the multiplier when the peripheral speed of the said one wheel is substantially constant, the ratio between the frequencies of the output signal and speed signal being capable of deviating temporarily from its normal value in response to a variation in the frequency of the speed signal, the improvement wherein a calculating means 14 supplies at intervals of time a number which is a function of the ratio between the frequencies of the output signal and speed signal and which represents the wheel slip, an actuating means 20 is responsive to the value of the number supplied by the calculating means 14 so as to generate an antiskid signal to control an antiskid cycle, the calculating means 14 comprise a counting circuit 16 of which the input receives the output signal from the frequency multiplier circuit 12 and of which the counting period equals the period of the speed signal, and a storage element 18 connected to the output of the counting circuit 16, the storage element 18 being capable of storing the value contained in the counting circuit in response to the supply of a store signal whose frequency equals the frequency of the speed signal, the storage element 18 supplying the number representing the wheel slip, the counting circuit 16 being arranged so that the value entered in said circuit cannot exceed a given value which is greater than the multiplication factor of the multiplier and less than the maximum counting capacity of said circuit, the operating means 20 comprising a circuit 24 for decoding the given value so as to supply a first decoded signal when the number entered in the storage element 18 possesses the given value, and the actuating means also comprising an output circuit 28 capable of supplying an antiskid signal in response to the appearance of the first decoded signal.

* * * * *